(12) United States Patent
Biran et al.

(10) Patent No.: US 11,924,057 B2
(45) Date of Patent: *Mar. 5, 2024

(54) IDENTIFICATION AND DISPLAY OF CONFIGURATION ITEM INFORMATION

(71) Applicant: ServiceNow, Inc., Santa Clara, CA (US)

(72) Inventors: Noam Biran, Kfar Menachem (IL); Madhavi Puvvada, Sammamish, WA (US); Serina Chang, Seattle, WA (US); Sreenevas Subramaniam, Dublin, CA (US); Jesus Antonio Castro Cisneros, Kirkland, WA (US); Brandon Thomas Trudel, Bellevue, WA (US); Kavitha Kotti, Redmond, WA (US)

(73) Assignee: ServiceNow, Inc., Santa Clara, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 17/301,742

(22) Filed: Apr. 13, 2021

(65) Prior Publication Data

US 2021/0234771 A1 Jul. 29, 2021

Related U.S. Application Data

(63) Continuation of application No. 16/125,238, filed on Sep. 7, 2018, now Pat. No. 10,992,544.

(51) Int. Cl.
*H04L 41/22* (2022.01)
*G06F 3/0483* (2013.01)
(Continued)

(52) U.S. Cl.
CPC ............ *H04L 41/22* (2013.01); *H04L 41/069* (2013.01); *H04L 41/145* (2013.01);
(Continued)

(58) Field of Classification Search
CPC ...... H04L 43/00–43/50; G06F 3/0481–3/0486
See application file for complete search history.

(56) References Cited

U.S. PATENT DOCUMENTS 6,321,229 B1 11/2001 Goldman
6,369,820 B1 * 4/2002 Bertram ................ G06F 11/328
709/224

(Continued)

FOREIGN PATENT DOCUMENTS

JP 6713267 B2 * 6/2020 ............. G01R 13/20

*Primary Examiner* — Clayton R Williams
(74) *Attorney, Agent, or Firm* — FLETCHER YODER PC

(57) ABSTRACT

Example embodiments for identifying and displaying configuration item information are presented herein. A system may involve a proxy server application disposed within a managed network that includes configuration items and a server disposed within a remote network management platform managing the managed network. The server may receive a request to view information representative of a particular configuration item from a client device. Based on the request, the server may obtain the information and transmit a representation of a graphical user interface to the client device. The representation may include a health graphic, a relationship graphic, a timeline graphic, and an activity stream, each of which represent pertinent information about the particular configuration item. The representation may also include a tabbed interface that facilitates navigation between attributes corresponding to the particular configuration item and attributes corresponding to other configuration items in the managed network.

13 Claims, 11 Drawing Sheets

(51) Int. Cl.
*H04L 41/069* (2022.01)
*H04L 41/14* (2022.01)
*H04L 43/045* (2022.01)
*H04L 67/56* (2022.01)

(52) U.S. Cl.
CPC ............ *H04L 43/045* (2013.01); *H04L 67/56* (2022.05); *G06F 3/0483* (2013.01)

(56) References Cited

U.S. PATENT DOCUMENTS

| | | | |
|---|---|---|---|
| 6,609,122 | B1 | 8/2003 | Ensor |
| 6,799,189 | B2 | 9/2004 | Huxoll |
| 6,816,898 | B1 | 11/2004 | Scarpelli |
| 6,895,586 | B1 | 5/2005 | Brasher |
| 7,027,411 | B1 | 4/2006 | Pulsipher |
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,350,209 | B2 | 3/2008 | Shum |
| 7,392,300 | B2 | 6/2008 | Anantharangachar |
| 7,610,512 | B2 | 10/2009 | Gerber |
| 7,617,073 | B2 | 11/2009 | Trinon |
| 7,685,167 | B2 | 3/2010 | Mueller |
| 7,689,628 | B2 | 3/2010 | Garg |
| 7,783,744 | B2 | 8/2010 | Garg |
| 7,890,802 | B2 | 2/2011 | Gerber |
| 7,930,396 | B2 | 4/2011 | Trinon |
| 7,933,927 | B2 | 4/2011 | Dee |
| 7,945,860 | B2 | 5/2011 | Vambenepe |
| 7,966,398 | B2 | 6/2011 | Wiles |
| 8,051,164 | B2 | 11/2011 | Peuter |
| 8,082,222 | B2 | 12/2011 | Rangarajan |
| 8,224,683 | B2 | 7/2012 | Manos |
| 8,266,096 | B2 | 9/2012 | Navarrete |
| 8,380,645 | B2 | 2/2013 | Kowalski |
| 8,457,928 | B2 | 6/2013 | Dang |
| 8,478,569 | B2 | 7/2013 | Scarpelli |
| 8,554,750 | B2 | 10/2013 | Rangaranjan |
| 8,646,093 | B2 | 2/2014 | Myers |
| 8,674,992 | B2 | 3/2014 | Poston |
| 8,689,241 | B2 | 4/2014 | Naik |
| 8,743,121 | B2 | 6/2014 | De Peuter |
| 8,745,040 | B2 | 6/2014 | Kowalski |
| 8,812,539 | B2 | 8/2014 | Milousheff |
| 8,818,994 | B2 | 8/2014 | Kowalski |
| 8,887,133 | B2 | 11/2014 | Behnia |
| 9,015,188 | B2 | 4/2015 | Behne |
| 9,137,115 | B2 | 9/2015 | Mayfield |
| 9,239,857 | B2 | 1/2016 | Trinon |
| 9,323,801 | B2 | 4/2016 | Morozov |
| 9,412,084 | B2 | 9/2016 | Kowalski |
| 9,467,344 | B2 | 10/2016 | Gere |
| 9,535,737 | B2 | 1/2017 | Joy |
| 9,557,969 | B2 | 1/2017 | Sharma |
| 9,613,070 | B2 | 4/2017 | Kumar |
| 9,659,061 | B2 | 5/2017 | Hutchins |
| 9,792,387 | B2 | 10/2017 | George |
| 9,852,165 | B2 | 12/2017 | Morozov |
| 10,002,203 | B2 | 6/2018 | George |
| 2006/0028999 | A1* | 2/2006 | Iakobashvili ............ H04L 43/08 370/252 |
| 2006/0187848 | A1* | 8/2006 | Zaniolo .................. H04L 43/50 370/242 |
| 2006/0224730 | A1 | 10/2006 | Fok et al. |
| 2010/0082701 | A1 | 4/2010 | Maheshwari |
| 2011/0270966 | A1 | 11/2011 | Zhou |
| 2012/0124503 | A1* | 5/2012 | Coimbatore .......... G06F 11/328 715/772 |

* cited by examiner

FIG. 6

600 — SEARCH (602)

USER ACCOUNT [Dashboard] [Form] [Update] [Delete]

604:
- Name
- Asset Tag
- Manufactuer
- Asset
- Class
- Comments
- Company
- Serial number
- Model ID
- Assigned to 606 — Configuration:
- Host name
- Department
- OS Domain
- Operating System
- OS Version
- OS Service Pack
- DNS Domain
- IP Address
- Description
- Disk space (GB)
- RAM (MB)
- CPU Manufactuer
- CPU Type
- CPU speed (MHz)
- CPU count
- CPU core count
- Is Virtual ☐

608 — Related Items | Related Items Search

IDENTIFICATION AND DISPLAY OF CONFIGURATION ITEM INFORMATION

CROSS-REFERENCE TO RELATED APPLICATIONS

This application is a continuation of and claims priority to U.S. patent application Ser. No. 16/125,238, filed Sep. 7, 2018, which is hereby incorporated by reference in its entirety.

BACKGROUND

An enterprise may use numerous computing devices to facilitate and manage many interrelated operations. Some of the computing devices may include client devices, server devices, routers, and virtual machines. These computing devices may have one or more software applications installed thereon. When managing these resources as well as others utilized by the enterprise, the term "configuration item" (CI) is often used to describe any physical or virtual device, application or application executing thereon a device. A configuration item can also used to describe the relationships between devices, applications, and services. As such, the configuration items discovered within the enterprise may be represented in a configuration management database (CMDB), which could be used by the enterprise or a management platform to manage the enterprise.

Each configuration item discovered within the enterprise can be associated with a large amount of information, such as operational parameters, relationships to other configuration items, installation information, etc. The large amount of information is represented in the form of attributes specific to the configuration item. When managing the enterprise, an administrator or another user might want to review the attributes of one or more configuration items, such as to identify changes in attributes that may contribute to errors that occurred during operations. The numerous attributes associated with a configuration item might not be presented to the user in a clear and efficient manner, which may require the user to allocate extra time searching for specific information about the configuration item. Additionally, some configuration items may have so much associated information that it is challenging to present all of the information even on large, modern displays.

SUMMARY

The embodiments herein introduce techniques for intelligently identifying and displaying configuration item information. Particularly, example embodiments may involve obtaining information about a configuration item and identifying pertinent attributes for the configuration item. Pertinent attributes may correspond to attributes that users often seek to review. As such, the pertinent attributes may be presented in a concise, logical arrangement using a graphical user interface on computing devices. Embodiments may involve using a tabbed interface that enables a user to quickly navigate between representations devoted to displaying attributes of different configuration items. For instance, a first tab may convey information regarding a first configuration item and a second tab may convey information regarding a second configuration item. This way, the user may quickly review and switch between information about multiple configuration items.

Further, each representation may include different graphical elements that enable quick review of attributes about the particular configuration item. For example, the representation for a particular configuration item may include a description of the particular configuration item, a health graphic configured to display health of the particular configuration item using a colorized chart component, a relationship graphic configured to display immediate relationships between the particular configuration item and other configuration items in the enterprise, a timeline illustrating recent changes in attribute values for the particular configuration item, a form field configured to organize and clearly represent key attributes for the configuration item, and an activity stream to further represent how attributes values were changed in a historical list format that also shows the users or systems that established each attribute value change. Other graphical elements may be included in other example representations.

The layout and compilation of information in example representations presented herein may enable efficient review of pertinent information about configuration items within an enterprise. Unlike representations often used to allow a user to search for configuration item information, the example representations described herein intelligently organize and arrange the information for a configuration item using graphics with easy to interpret visuals. Further, each representation may account for the limited screen size available on computing devices. Particularly, the different graphics included within an example representation may be rearranged as well as expanded or contracted to reveal or hide details related to attribute values. This way, a user may select a particular graphic to view additional details or attributes for the particular configuration item. In addition, the tabbed interface may allow multiple representations to be swiftly navigated between by a user allowing the user to switch between and view information about multiple configuration items.

Accordingly, a first example embodiment may involve a system that includes a proxy server application disposed within a managed network. The managed network may include a plurality of configuration items. The system may also include one or more server devices disposed within a remote network management platform. The remote network management platform may manage the managed network and the one or more server devices may be configured to obtain information regarding the plurality of configuration items by way of the proxy server application. The one or more server devices may also be configured to receive, from a client device, a request to view information representative of a particular configuration item. Based on the request, the one or more server devices may be configured to obtain information regarding the particular configuration item, and transmit a representation of a graphical user interface to the client device. The representation of the graphical user interface may include: (i) a health graphic configured to represent health of the particular configuration item, (ii) a relationship graphic configured to represent first level relationships between the particular configuration item and one or more configuration items of the plurality of configuration items in the managed network, (iii) a timeline graphic configured to represent attribute value changes for the particular configuration item during a predefined duration, (iv) an activity stream configured to represent a historical listing of attribute value changes for the particular configuration item, and (v) a tabbed interface. The tabbed interface may facilitate navigation between attributes corresponding to the particular configuration item and attributes corresponding to one or more other configuration items of the plurality of configuration items in the managed network.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 depicts a graphical user interface for displaying information related to a configuration item, in accordance with example embodiments.

DETAILED DESCRIPTION

Figure 1:
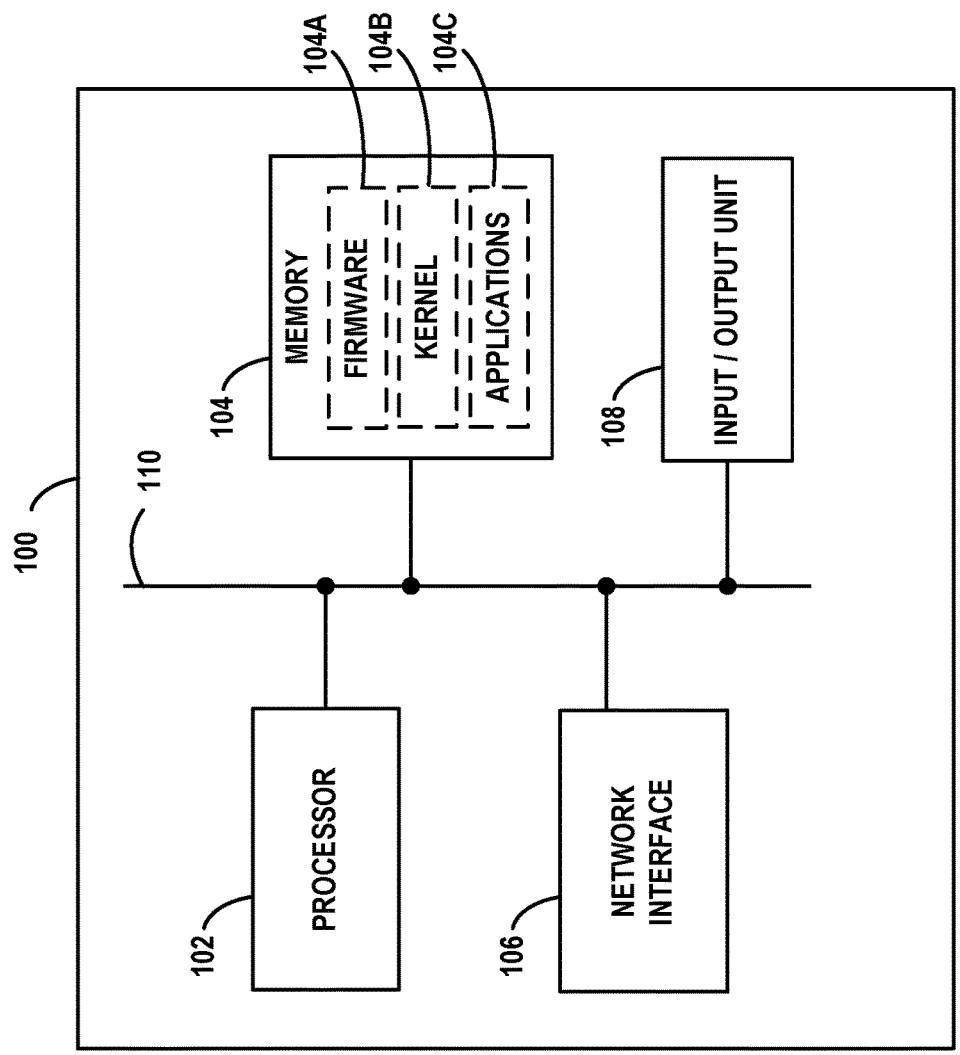
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
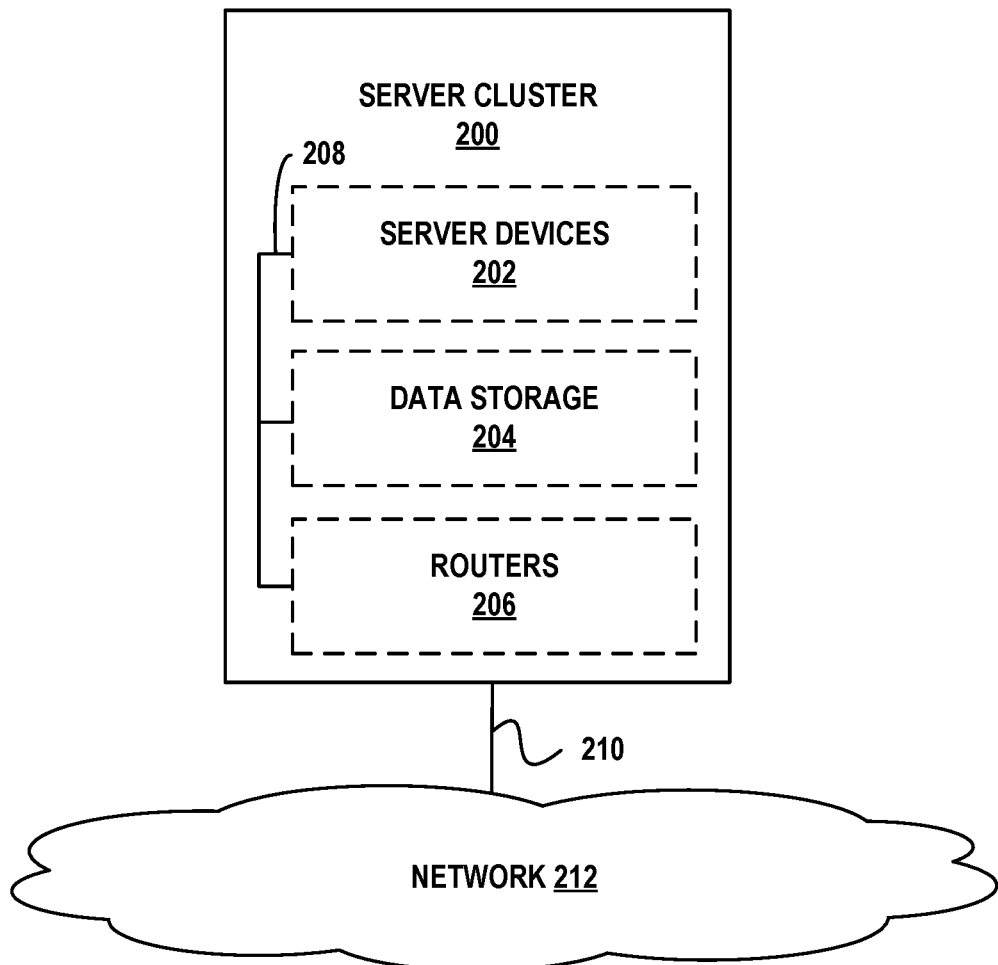
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
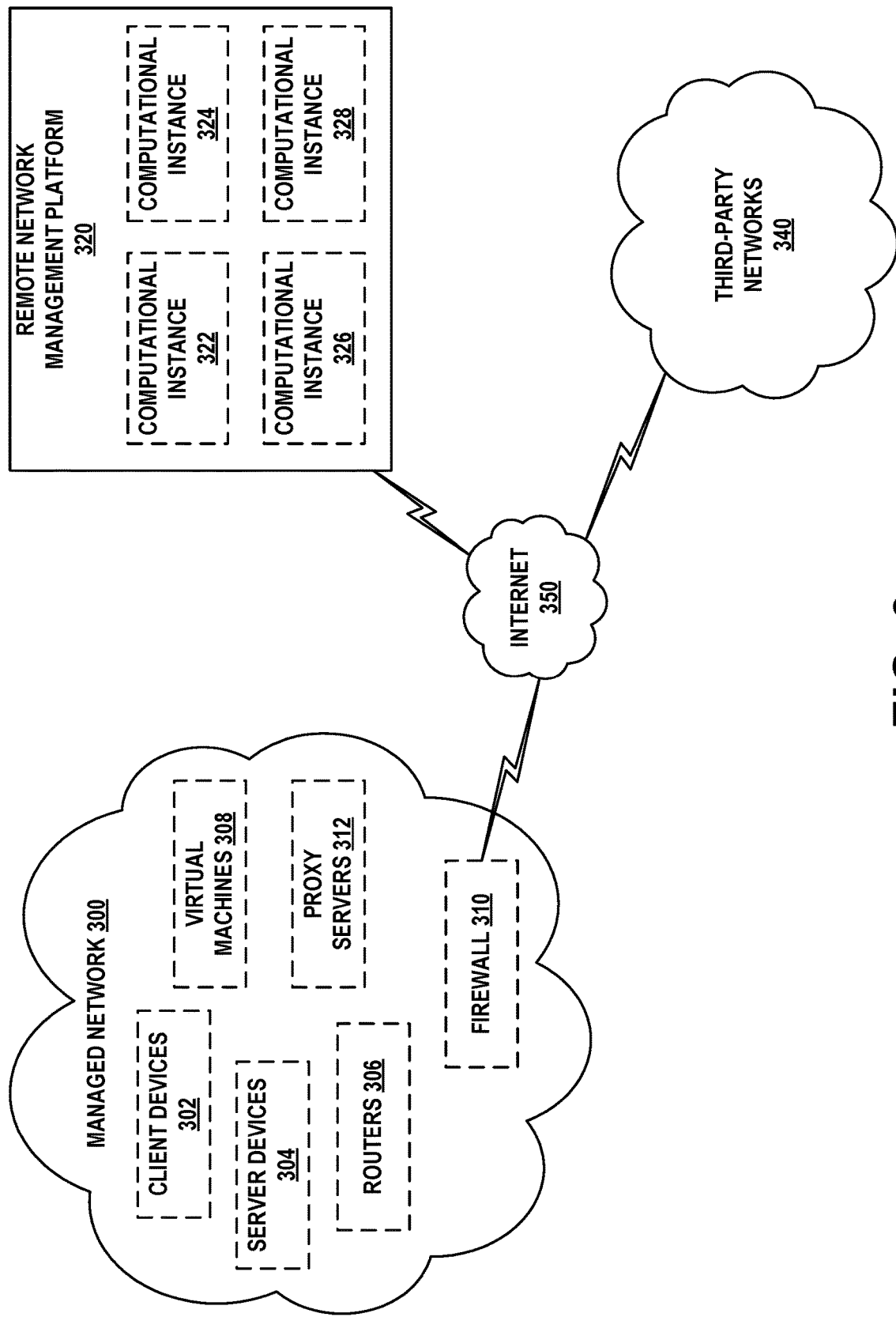
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
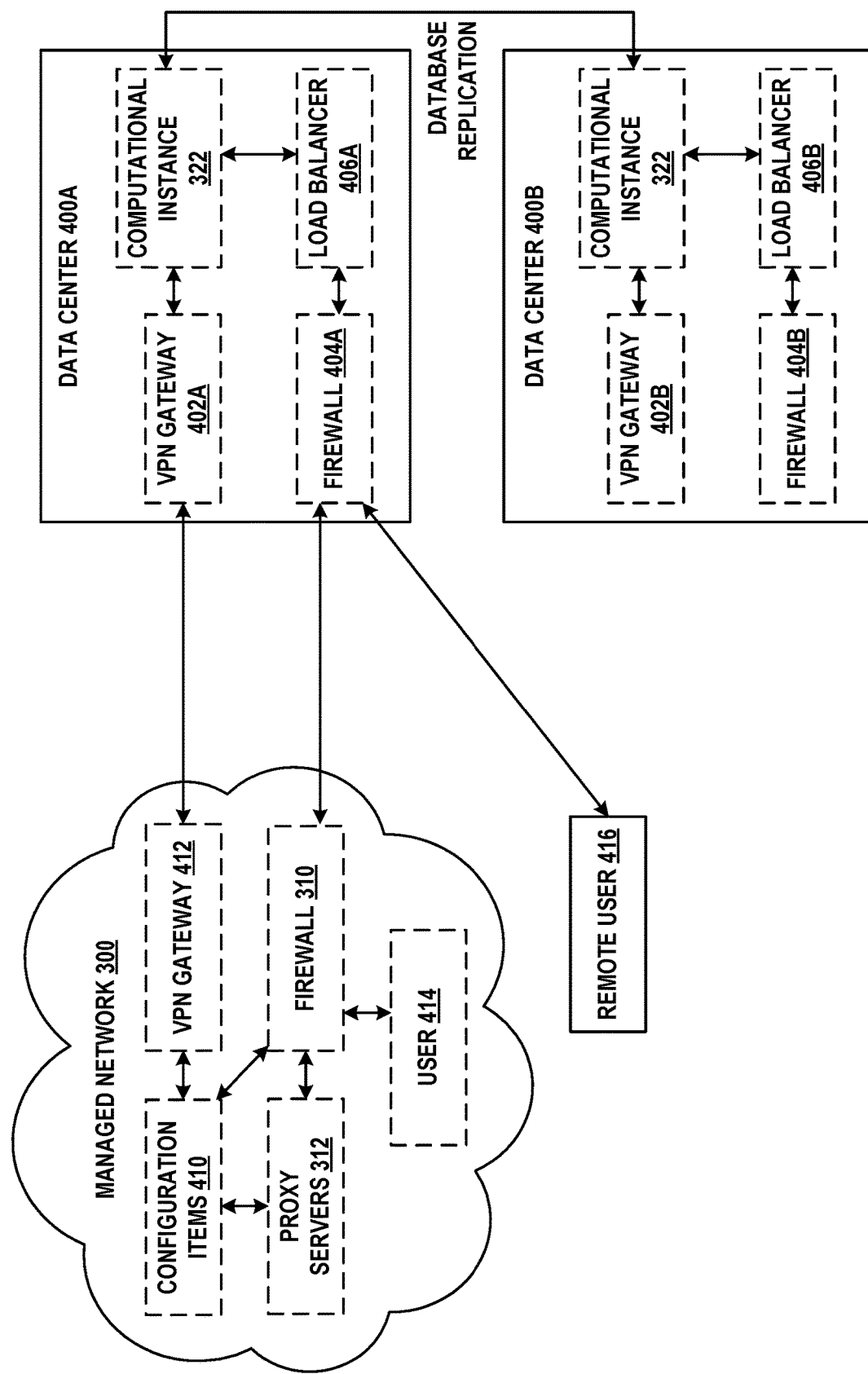
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
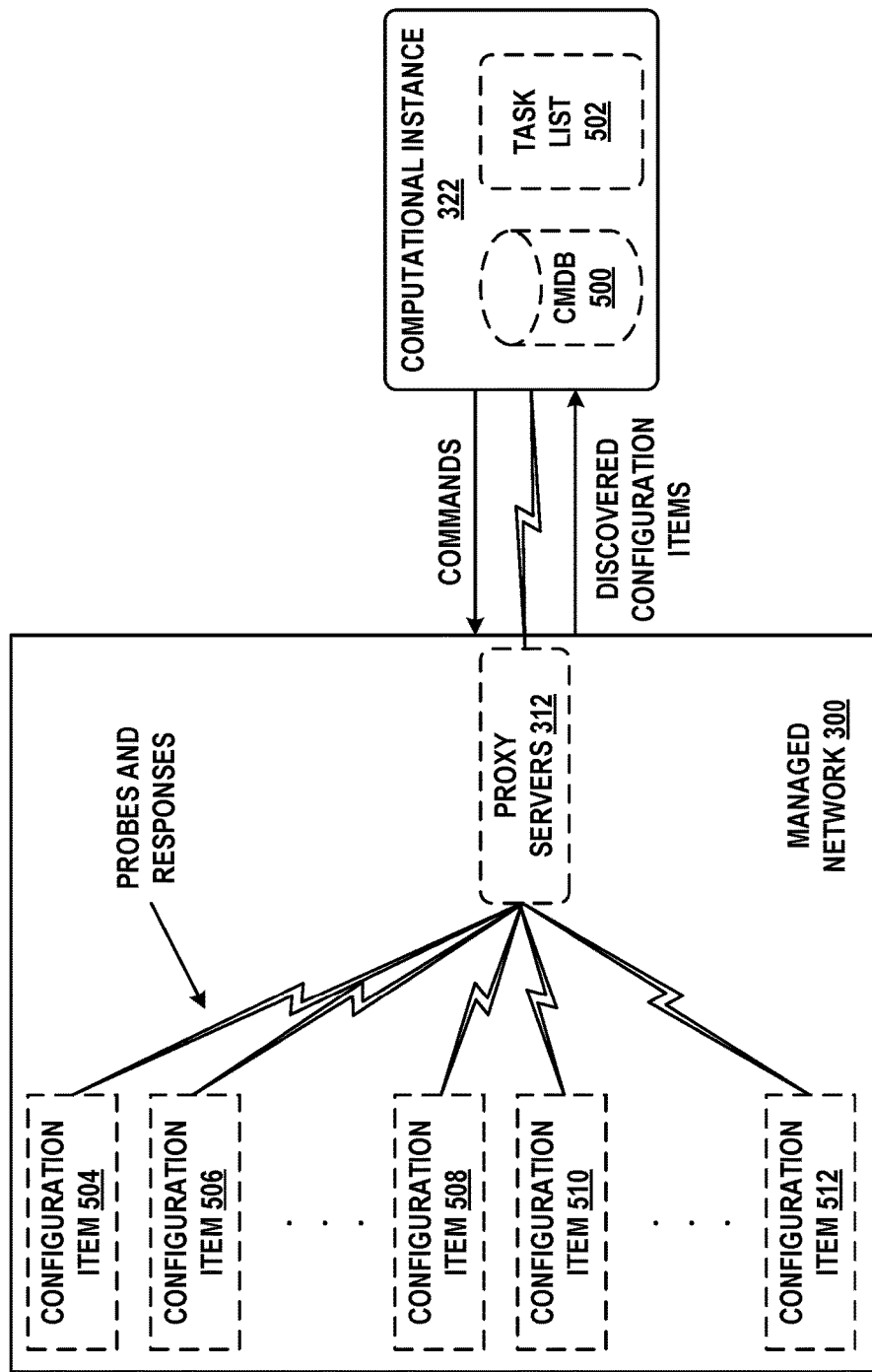
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
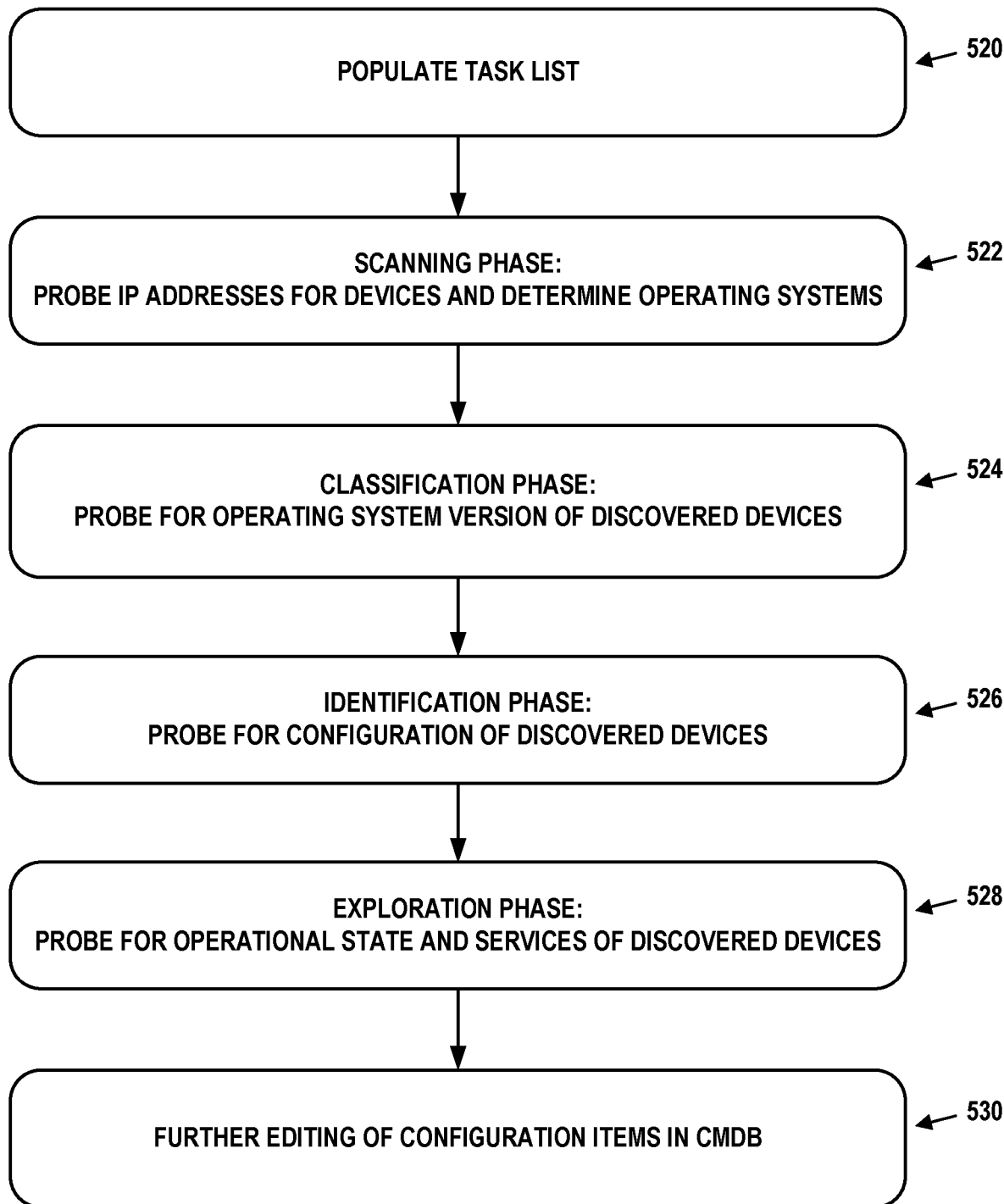
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE IMPROVED DISPLAY OF CONFIGURATION ITEM INFORMATION

Each configuration items discovered within an enterprise is often associated with a large amount of information. The information may be arranged into a number of attributes that describe different parameters about the configuration item as the relationships between the configuration item and other configuration items within the enterprise. For example, some attributes may describe technical data regarding the configuration item, such as software version, model numbers, hardware and manufacturer specifications, and other technical details (e.g., networking speeds, data storage size). Other attributes may describe ownership information regarding the configuration item, such as financial asset management information, ownership attributes, record purchase data, bar codes, software and hardware documentation, warranty, location, and user account or enterprise operation responsible for the configuration item. Further, some attributes may describe relationship information about the configuration item, such as connections between the particular configuration item and other configuration items (e.g., hardware, software applications, users) in the enterprise.

Systems or users assigned to manage the enterprise may view attribute values for configuration items when monitoring the health and performance of operations within the enterprise. When a new configuration item is added to or formed within the enterprise, the configuration item, as well as attribute values describing the configuration item, may be stored in the CMDB that describes the enterprise. The different attributes may then be searched for and analyzed when making modifications to operations within the enterprise or monitoring the performance and health of the operations.

In some embodiments, a remote network management platform may manage configuration item information for a managed network. For example, remote network management platform 320 may perform a discovery process (e.g., the discovery process shown in FIG. 5B) to discover and subsequently maintain configuration item information for managed network 300. Managing the configuration item information may involve enabling users within managed network 300 to be able to search and review attributes for configuration items.

With all the information available for each configuration item within the enterprise, it can be difficult to display configuration item information in a logical manner that enables quick review by a user. Further, computing devices have limited display space for depicting the information. As a result, configuration item information is often displayed inefficiently. In some cases, users might need to perform numerous searches prior to finding information that the user deems pertinent for a particular configuration item. To illustrate an example, FIG. 6 is included herein. Particularly, FIG. 6 depicts a graphical user interface that represents an example layout. Graphical user interface 600 might require a user to search for configuration items by searching for particular attributes associated with the configuration item or items that the user wishes to review.

Graphical user interface 600 includes input forms that might require a user to input particular attributes about a configuration to search for information about the configuration item. For instance, the sidebar of graphical user interface 600 includes search 602, which may serve as a general search command that might fail to return information specific to a particular configuration item as desired by a user. Instead, search 602 might be configured to require a user to provide a particular configuration item name in order to review information for that configuration item.

Graphical user interface 600 also includes form input fields 604 and form input fields 606 that enable a user to search for a specific configuration item by inputting particular attribute values in the correct form field. Although form inputs 604-606 may enable a user to search per particular attribute values, the user might be required to input the correct values in the appropriate form field, and an inexperienced user may fail to do so. Related items section 608 may similarly require the user to input correct search terms to discover specific configuration item information.

To assist a user quickly identify and review desired configuration item information, example embodiments may obtain and intelligently identify pertinent attributes for the configuration item. For instance, a system may receive a request for configuration item information about a particular configuration item. The system may then obtain the information and intelligently identify attributes for that configuration item that the user might prefer to review. The attributes may correspond to attributes that users often seek to review.

After identifying these attributes, the system may present the attributes in a concise, logical arrangement in a graphical user interface. The representation may use a tabbed interface that enables a user to quickly navigate between representations devoted to displaying attributes at different configuration items. For instance, each tab may convey information regarding a different configuration item. This way, the user may quickly review and switch between information about multiple configuration items.

Example representations may include graphics that enable quick review of attributes about the particular configuration item. For example, the representation for a particular configuration item may include a description of the particular configuration item, a health graphic configured to display health of the particular configuration item using a colorized chart component, a relationship graphic configured to display immediate relationships between the particular configuration item and other configuration items in the enterprise, a timeline illustrating recent changes in attribute values, associated incidents, alerts, and change requets for the particular configuration item, a form field configured to organize and clearly represent key attributes for the configuration item, and an activity stream to further represent how attributes values were changed in a historical list format that also shows the users or systems that established each attribute value change. Other graphics or items may be included in other example representations.

The layout and compilation of information in example representations presented herein may enable efficient review of pertinent information about configuration items within an enterprise. Unlike the graphical user interface shown in FIG. 6 and other similar representations often used to allow a user to search for configuration item information, the example representations described herein organize and arrange the information for a configuration item using graphics with intuitive visuals. Further, each representation may factor the limited screen size available on computing devices used by users to review configuration item information. As such, example representations may try to display the most relevant attributes for a selected configuration item by default and organize the display of attributes by attribute type. In addition, the different graphics included within an example representation may be rearranged as well as expanded or contracted to reveal or hide details related to attribute values. This way, a user may select a particular graphic to view additional details or attributes for the particular configuration item. Further, the tabbed interface may allow multiple representations to be swiftly navigated between by a user allowing the user to switch between and view information about multiple configuration items or multiple sets of grouped attributes of a single configuration item.

Figure 7A:
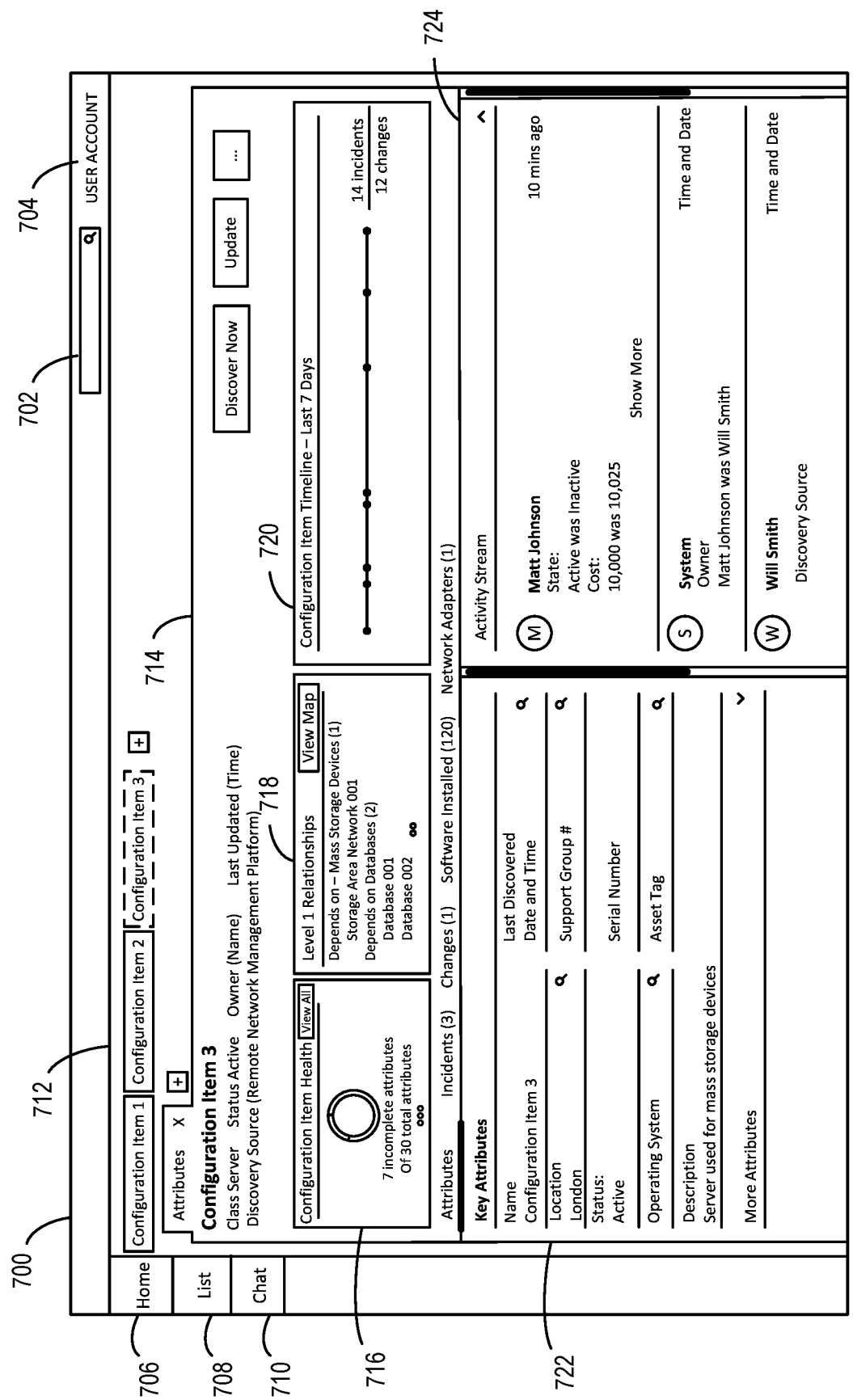
FIG. 7A depicts an improved graphical user interface for intelligently displaying information related to a configuration item, in accordance with example embodiments.

FIG. 7A depicts an improved graphical user interface for intelligently displaying information related to a configuration item, in accordance with example embodiments. Graphical user interface 700 may be used to represent information related to a configuration item in an intelligent arrangement that enables quick and efficient review. A system configured to generate graphical user interface 700 may intelligently identify information about a particular configuration item selected by a user (e.g., configuration item 3) and arrange the information using the layers and graphics shown in FIG. 7A. In some instances, the system may cause a display to show graphical user interface 700 in response to a user selecting a configuration item linked on a form field or the user performing a configuration item-related search.

As shown in FIG. 7A, graphical user interface 700 includes a general search box 702, user account indication 704, home option 706, list option 708, chat option 710, tabbed interface 712, and attributes section 714 for the selected configuration item. The design of graphical user interface 700 is such that pertinent information is displayed in an easy to understand format. In addition, the graphics may be selected (or hovered over using a pointer) by a user to reveal further information about the configuration item, including details about attributes that might not be initially shown in the default format of graphical user interface 700.

General search box 702 is shown located in the header of graphical user interface 700 along with user account indication 704. As such, a user may enter text into general search 702 to request information pertaining to a particular configuration item within the enterprise. In some embodiments, a system may use natural language processing to understand search queries provided via general search box 702. User account indication 704 may represent the user utilizing the computing device (e.g., client device 302) displaying graphical user interface 700, such as a user name or user identification.

Home option 706, list option 708, and chat option 710 may represent selectable elements. For example, selection of home option 706 may enable the user to view a predefined homepage. List option 708 may change the format of information displayed in graphical user interface 700. For instance, selection of list option 708 may cause a number of configuration items and attributes associated with each to be displayed in a list format. In some embodiments, list option 708 may cause different categories to display, such as servers, workstations, and network gear along with additional options. Chat option 710 may cause a chat interface to appear to enable the user to chat with an agent (e.g., human agent or virtual agent).

Tabbed interface 712 serves to facilitate navigation between different representations conveying attributes for configuration items and other possible information. As shown in FIG. 7A, tabbed interface 712 includes a first tab for "configuration item 1", a second tab for "configuration item 2", and a third tab for "configuration item 3," as well as an option to create more tabs. Each tab corresponds to a representation depicting information for a particular configuration item.

Each configuration name is shown for illustration purposes, but can vary depending on the particular configuration item and the naming structure utilized by the system managing the enterprise. Further, the third tab for "configuration item 3" is shown as selected, resulting in attributes section 714 conveying attributes and other information related to configuration item 3. As such, selection of the second tab or the first tab would could the attributes section 714 to display information pertinent to those configuration items. With the tabbed interface 712, a user may quickly switch between viewing information relating to different configuration items.

Attributes section 714 includes information about the selected configuration item (i.e., configuration item 3) arranged in a way to enable quick review of this information, such as attribute changes, key attributes, health, as well as other information. As shown in FIG. 7A, attributes section 714 includes a header that indicates that the representation is conveying information about configuration item 3 along with general information specific to configuration item 3 (i.e., class, status, owner, last updated, and discovery source). Configuration items may be grouped into different types of asset classes, such as types of hardware (e.g., computing device, server device), software, and consumable. Status may indicate if a configuration item is active or offline (e.g., installed or uninstalled). Owner may represent the user account or user name associated with the configuration item. In some instances, owner may correspond to a group within an enterprise (e.g., IT, human resources (HR)). Last updated may indicate the last time the specific configuration item was updated. Discovery source may indicate the system or computing device that discovered the configuration item within the enterprise. Discovery source may also indicate the date and time of the last scan performed to discover the configuration item.

The header in attributes section 714 also includes a right section that is configured with action buttons, such as a discover now button, an update button, and a " . . . " button selectable to show additional action buttons currently hidden to conserve display space. The discover now button represents a selectable option that may trigger the performance a new discovery process related to configuration item 3, such as the discovery process described in FIG. 5B. In some examples, the discover now button may be allocated to representations associated with administrators of the enterprise. The update button, when selected, may be configured to update the configuration item form with any new changes not currently shown in attributes section 714.

The update button may be used in a situation where the user modified attributes of the represented configuration item and wishes to see that these modifications were fully realized by the system. In other embodiments, the right section may include other action buttons, such as a delete option to delete the represented configuration item, a create change action button to pass a selected configuration item to a change creation form provided by the system, and a create incident option to pass the selected configuration item to the incident creation form also provided by the system.

Attributes section 714 may also include graphics to display information about the selected configuration item (e.g., configuration item 3). As shown in FIG. 7A, attributes section 714 includes health graphic 716, relationship graphic 718, timeline graphic 720, form fields 722, and activity stream 724. These elements serve to clearly and concisely show configuration item information and are described in further detail in FIGS. 7B-7E. Although the different elements are shown in a particular arrangement in attributes section 714, other example embodiments may include more or fewer elements arranged in different configurations. Further, each element may be customizable by a user, including the ability to resize and reposition graphics as desired. In some embodiments, the system may be configured to enable a user to set a default arrangement of these elements when viewing graphical user interface 700.

Figure 7B:
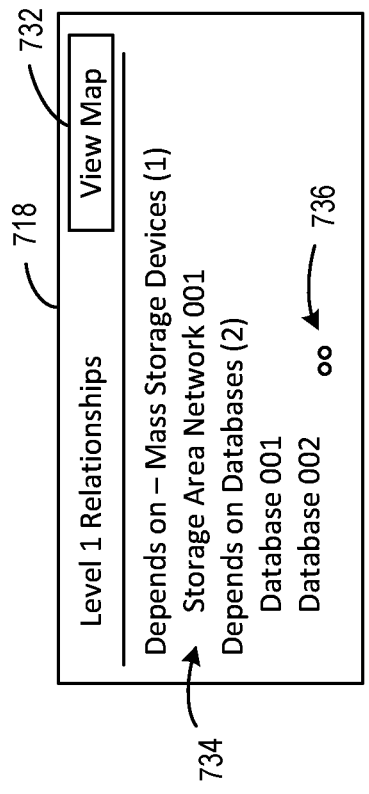
FIG. 7B depicts the health graphic from the graphical user interface shown in FIG. 7A.

FIG. 7B depicts health graphic 716 from graphical user interface 700. Health graphic 716 represents a widget in graphical user interface 700 that may convey a general health or multiple health statistics (e.g., metrics) of a configuration item (i.e., configuration item 3 shown in graphical user interface 700). Particularly, health graphic 716 includes chart component 726, text 728, view all option 729, and additional options 730. In other embodiments, health graphic 716 may represent other information or have another configuration. The health statistics shown can be modified by the user or the system, including the ability to add or remove health statistics.

Chart component 726 may represent health statistics regarding the selected configuration item. The health statistics represented by chart component 726 can differ within example implementations. As shown in FIG. 7B, chart component 726 can have a circular graph appearance. In other embodiments, other types of visual representations can be used, such as bar graphs or percentage indications, among others.

In the example embodiment shown in FIG. 7B, chart component 726 is shown representing a number of incomplete attributes relative to a total number of attributes for the selected configuration item (e.g., 7 incomplete attributes of 30 total attributes for configuration item 3). Particularly, the entire circle of the circular graph represents 30 total attributes and the smaller section of the circle represents the 7 incomplete attributes. An incomplete attribute may indicate a required attribute of the particular configuration item that is not filled out. As such, an incomplete attribute may indicate that an attribute or attribute value of the configuration item needs an update or additional information (e.g., information provided by the user or system). For instance, incomplete attributes may not be used to identify and analyze the configuration item.

Although chart component 726 is shown only in black and white, color may be used in other embodiments in chart component 726. In addition, to further assist a user understand the context of health graphic 716, text 728 is included to describe what chart component 726 visually shows. As shown in FIG. 7B, text 728 may specify that there are 7 incomplete attributes out of 30 total attributes for configuration item 3.

Health graphic 716 further includes additional options 730 that are selectable by a user to change information represented within health graphic 716. View all option 729 may be used to display more or all of the health metrics gathered for the particular configuration items. As such, view all option 729 and additional options 730 are included to allow a user to view further health information about configuration item 3 while still maintain a clean, organized appearance within attribute section 714. For example, selecting addition option 730 may cause health graphic 716 to transition from showing incomplete attributes to showing a number of stale relationships relative to the total number of relationships for configuration item 3. A stale relationship may represent a relationship that is no longer valid. For instance, the connection between configuration item 3 to another configuration item may no longer exist, but an administrator may be required to remove the relationship altogether. Similarly, a stale relationship may indicate that the relationship fails to satisfy a threshold performance value. A stale relationship may indicate that one of the configuration items within the relationship is stale.

In addition, selecting additional options 730 a second time may further cause health graphic 716 to show another health analysis regarding configuration item 3, such as the number of non-compliant relationships to the total number of relationships for the selected configuration item. A non-compliant relationship may fail to satisfy predefined rules set forth by an administrator or the system for relationships between configuration items. As such, when a user utilizes additional options 730 to change the information represented within health graphic 716, the chart component 726 and text 728 may both change accordingly.

In some examples, other health analytics can be shown using chart component 726. A user may specify which health analytics to show. Further, the user or the system may enable health analytics to be modified, added, or decreased.

In some embodiments, chart component 726 may use color to represent health of the selected configuration item. For example, if the number of stale relationships, incomplete attributes, or non-compliant relationships is less than a first predefined threshold of a total (e.g., less than 15% of the total relationships or attributes of the selected configuration item), chart component 726 may use a first color (e.g., green) to indicate a good health for the selected configuration item for that health category. Similarly, if the number of stale relationships, incomplete attributes, or non-compliant relationships is less greater than the first predefined threshold of a total but less than a second predefined threshold of the total (e.g., between 16% to 30%), chart component 726 may use a second color (e.g., yellow) to indicate the health for the selected configuration item for that health category. Further, if the number of stale relationships, incomplete attributes, or non-compliant relationships is greater than the second predefined threshold of the total (e.g., 31% or greater), chart component 726 may use a third color (e.g., red) to indicate poor health for the selected configuration item for that health category. Other color schemes can be used in embodiments as well.

Figure 7C:
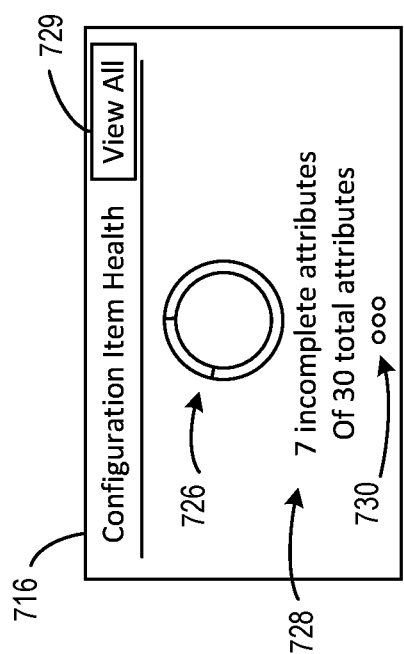
FIG. 7C depicts the relationship graphic from the graphical user interface shown in FIG. 7A.

FIG. 7C depicts relationship graphic 718 from graphical user interface 700. Relationship graphic 718 may represent first level relationships, which are immediate relationships to the selected configuration item (i.e., configuration item 3). An immediate relationship involves direct communication or a direct connection between two configuration items without another configuration item in between. Conversely, second level relationships are indirect connections between the selected configuration item and other configuration items in the enterprise. As such, a system may intelligently display immediate relationships to a selected configuration item since those relationships are likely to have the most impact on the selected configuration.

In some embodiments, the first level relationships may be shown in the following format (e.g., format 734) in relationship graphic 718 shown below:

[Relationship type]—[Class type—(link)] (#)

[CI name (link)]
[CI name (link)]
...
[Relationship type]—[Class type—(ink)]

Format 734 includes the symbol (#) to indicate a count of the configuration items listed within the [Relationship type]— [Class type].

In some examples, a selected configuration item may include numerous first level relationships. When there are too many first level relationships to display within relationship graphic 718 at the same time, relationship graphic 718 may use pagination to enable a user to view different pages representing the relationships. As a result, relationship graphic 718 may remain concise while also enabling a user to view all first level relationships. Symbols 736 may be used to indicate when additional first level relationships are available for viewing. Relationship graphic 718 may represent the information in a different format within other embodiments. In some examples, relationship graphic 718 may also show second level and other level relationships to the selected configuration item.

As shown in FIG. 7C, relationship graphic 718 may further include view map option 732. Selection of view map option 732 by a user may cause graphical user interface 700 to display a visual dependency map that illustrates the first level relationships (and possibly second level relationships, etc.) for the selected configuration item. In some examples, the map may further show relationships of other levels to the selected configuration item.

In some embodiments, selection of view map option 732 may serve as a link to the dependency map of the selected configuration item stored within in another platform prompting a new browser tab to open to show the dependency map. As such, the map may enable a user to further view immediate and possible secondary relationships to the selected configuration item in a clear, visual format, such as a dependency tree or graph. In additional examples, view map option 732 may be described using other terms, such as "View Dependencies."

Figure 7D:
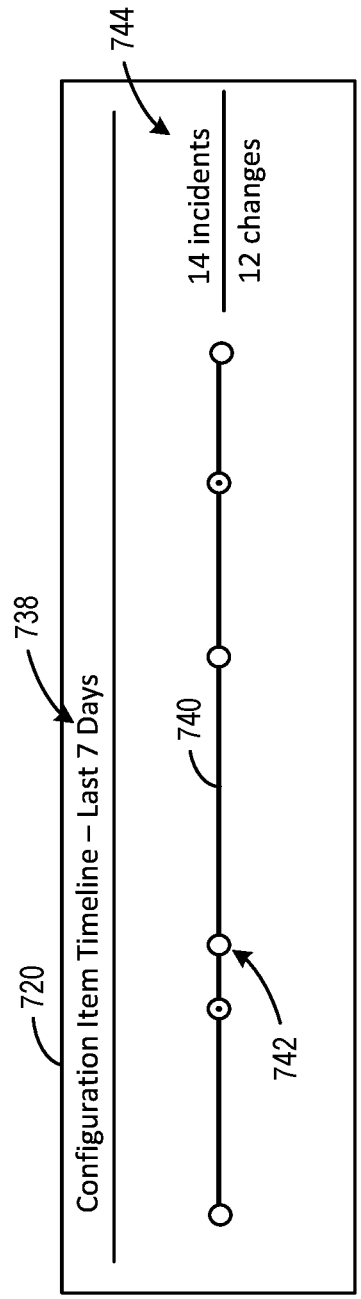
FIG. 7D depicts the timeline graphic from the graphical user interface shown in FIG. 7A.

FIG. 7D depicts timeline graphic 720 shown in graphical user interface 700. Timeline graphic 720 may display one or more of attribute value changes, incidents, change requests, and alerts that have occurred to the selected configuration item over a predefined period of time (e.g., last 7 days). The predefined period of time may be indicated in header 738 of timeline graphic 720 to enable a user to understand the duration that is represented. In some embodiments, the system may permit a user to adjust the predefined period of time. The system may also be configured to actively select the predefined period of time based on the timing of attribute changes associated with the selected configuration item. For instance, if a substantial number of attribute value changes occurred during a two week span, the system may cause timeline graphic 720 to display attribute value changes over that two week period. In another example, timeline graphic 720 may enable an administrator or a user to select viewing timelines that correspond to different recent periods of time (e.g., a 7 day option, a 14 day option, and a 30 day option).

Timeline 740 is shown included in timeline graphic 720 to visually represent when attribute changes/incidents occurred relative to other changes/incidents. In some embodiments, timeline 740 may include numbers or a time scale to visually differentiate between the days represented.

As shown in FIG. 7D, timeline 740 also includes indicators 742 that represent when incidents or changes occurred. Each indicator 742 represents an attribute value change, an incident, a change request, an alert or other information associated with configuration item 3 that occurred during the predefined period. Particularly, each indicator 742 may represent a time of the associated even by its position in timeline 740. In some examples, timeline 740 may include indicators 742 representing recent changes in attribute values, associated incidents, alerts, and change requests. Timeline 740 may be configured to display other information.

As further shown in FIG. 7D, indicators 742 can have different forms to represent different information. Particularly, as represented in table 1 below, indicators 742 may have a different configuration based on the number of changes represented. When a user selects or hovers over a particular indicator, underlying information associated with the attribute change or incident represented by that particular indicator may be shown. Table 1 also represents examples of possible additional information that may be shown when an indicator is selected.

TABLE 1

| Category | Icon | Tooltip Display |
|---|---|---|
| Single change | ○ | Example:<br>George Warren changed location:<br>'San Diego' to 'London'<br>2018 Feb. 14 10:52:03<br>'View in Activity Feed' |
| Multiple changes | ⊙ | Example 1:<br>13 total attribute value changes<br>2018 Feb. 11 05:19:01<br>(or)<br>Example 2:<br>3 of 15 changes shown:<br>System changed Monitor: 'false' to 'true'<br>System changed is clustered: 'false' to 'true'<br>System changed Operational: 'Not Operational'<br>to 'Operational' |

Timeline graphic 744 may also include description 744 that utilizes text to indicate the number of incidents and number of attributes that have occurred during the predefined period to the selected configuration item. The combination of description 744 and timeline 740 may enable a user to quickly determine recent changes and incidents for the selected configuration item. In other examples, timeline graphic 744 may display information in another configuration.

Figure 7E:
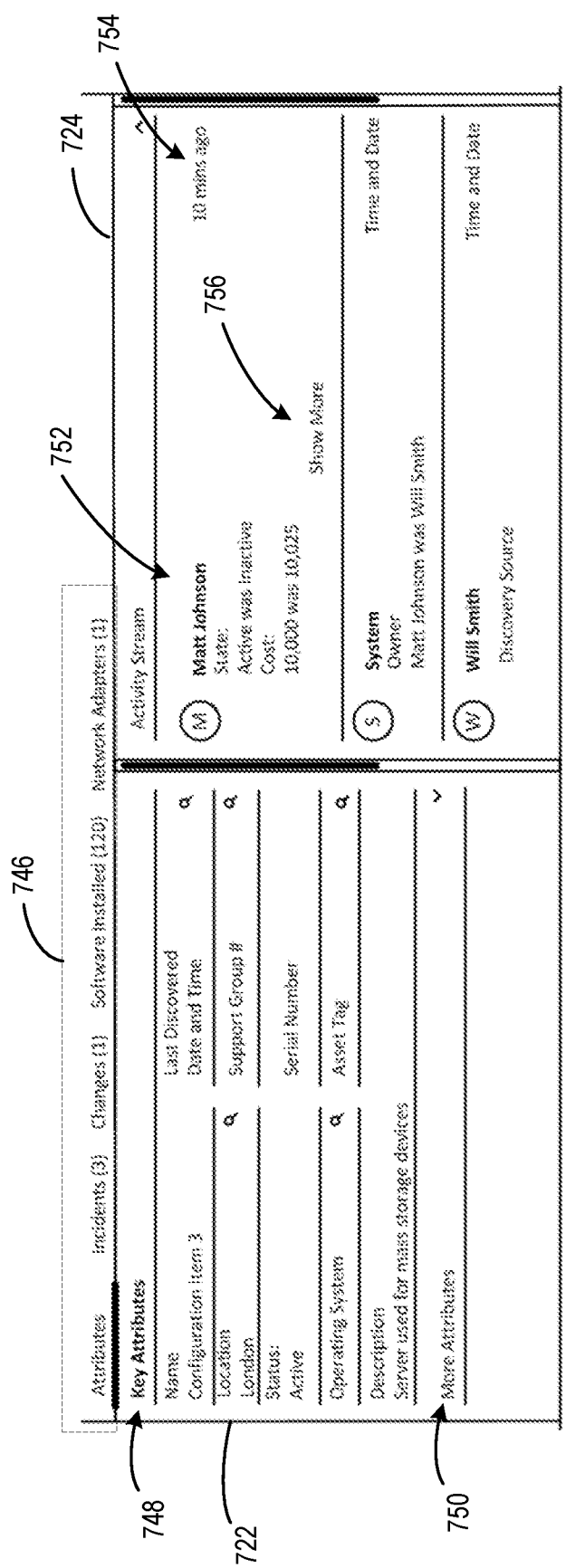
FIG. 7E depicts the form fields and the activity stream shown in the graphical user interface shown in FIG. 7A

FIG. 7E depicts form fields 722 and activity stream 724 shown in graphical user interface 700. Form fields 722 is shown separated into two sections: key attributes 748 and more attributes 750. Each section may be expanded or collapsed to show more or less information. Key attributes 748 may be expanded by default and includes particular attributes and their associated field values. Particularly, key attributes indicates name, location, status, operating system, description, list discovered, support group number, serial number, asset tag. Other example attributes, such as virtual, disk space, CPU count, CPU core count, etc., may be included as well. The attributes shown in key attributes 748 may vary based on a type or class of the configuration item. More attributes 750 may be collapsed by default. Expanding on the area may display all other attributes and their associated values in two columns in a default or user-configured ordered.

Activity stream 724 may display a historical timeline of changes in attribute values of the selected configuration item. Within activity stream 724, each stream section may display information about a user or the system that changed the attribute value and an indication of the change. As shown in FIG. 7E, section 752 includes an avatar picture (represented by "M") and a user's name ("Matt Johnson"), timestamp 754 ("10 mins ago"), and an indication of an attribute change ("Active was inactive and Cost: 10,000 was 10,025"). The indication of the change in attribute is shown using the following format: [Attribute]: [New Value] was [Old Value]. In other examples, each stream section may display information in other formats, which may include more or less information than the amount shown in FIG. 7E.

It is possible that the content within each section or activity stream 724 may exceed a height permitted by the size of graphical user interface 700. In such a situation, content within one or more stream sections may be partially concealed and activity stream (or individual stream sections) may include an option to expand in order to show the full length of attribute value changes for that time period. For example, activity stream 724 may include a "Show More" link 756 that may expand the amount of information displayed in activity stream 724.

In some embodiments, activity stream 724 may further include one or more filter options. For instance, activity stream 724 may include a filter icon that causes any attribute that has been changed within the full timeline to be dynamically shown.

Related list 746 is also depicted in FIG. 7E. Related list 746 may display as tabs for one or more configuration item forms. As shown in FIG. 7E, related list 746 includes attributes (shown selected), incidents, changes, software installed, and network adapters. Related list 746 may be customizable by the user or the system in some examples. In other embodiments, related list 746 may show tabs for other configuration item forms, such as relationships, related incidents, related tasks, and related events, among others. These tabs can be based on a configuration item type or class. It is possible that the width required to display the different configuration item forms exceeds the default set width available. As such, the remaining list tabs may be combined into a "More" dropdown tab that can be selected to show the remaining configuration item tabs. In addition, each item form further includes a number representing the number of items associated with that configuration item form. Each tab may display different information for about the selected configuration item. Table 2 below illustrates some example information that tabs may display.

TABLE 2

| List Name/Details | Columns |
| --- | --- |
| Relationships | Parent |
|  | Relationship Type |
|  | Child |
|  | Updated |
| Incidents | Incident Number |
|  | Short Description |
| (Incident number-Reference | Caller |
| Number > Open respective | Priority |
| incidents) | State |
| Related Tasks | Task Number |
|  | Priority |
|  | State |
|  | Short Description |
| (Task number-Reference | Assignment Group |
| Number > Open respective | Assigned to |
| tasks) |  |
| Related Events | Alert Number |
|  | Severity |
| (Event number-Reference | Source |
| Number > Open respective | Description |
| events) | Node |
| Changes | Change Number |
|  | Short Description |

TABLE 2-continued

| List Name/Details | Columns |
| --- | --- |
| (Change number-Reference | Type |
| Number > Open respective | State |
| change events) | Planned start date |
|  | Planned end date |
|  | Assigned to |
| [Related Tables] | [Default Table Columns] |
| If a related table has been |  |
| added to this CI, then these will |  |
| display as a related list tab |  |

VI. EXAMPLE OPERATIONS

Figure 8:
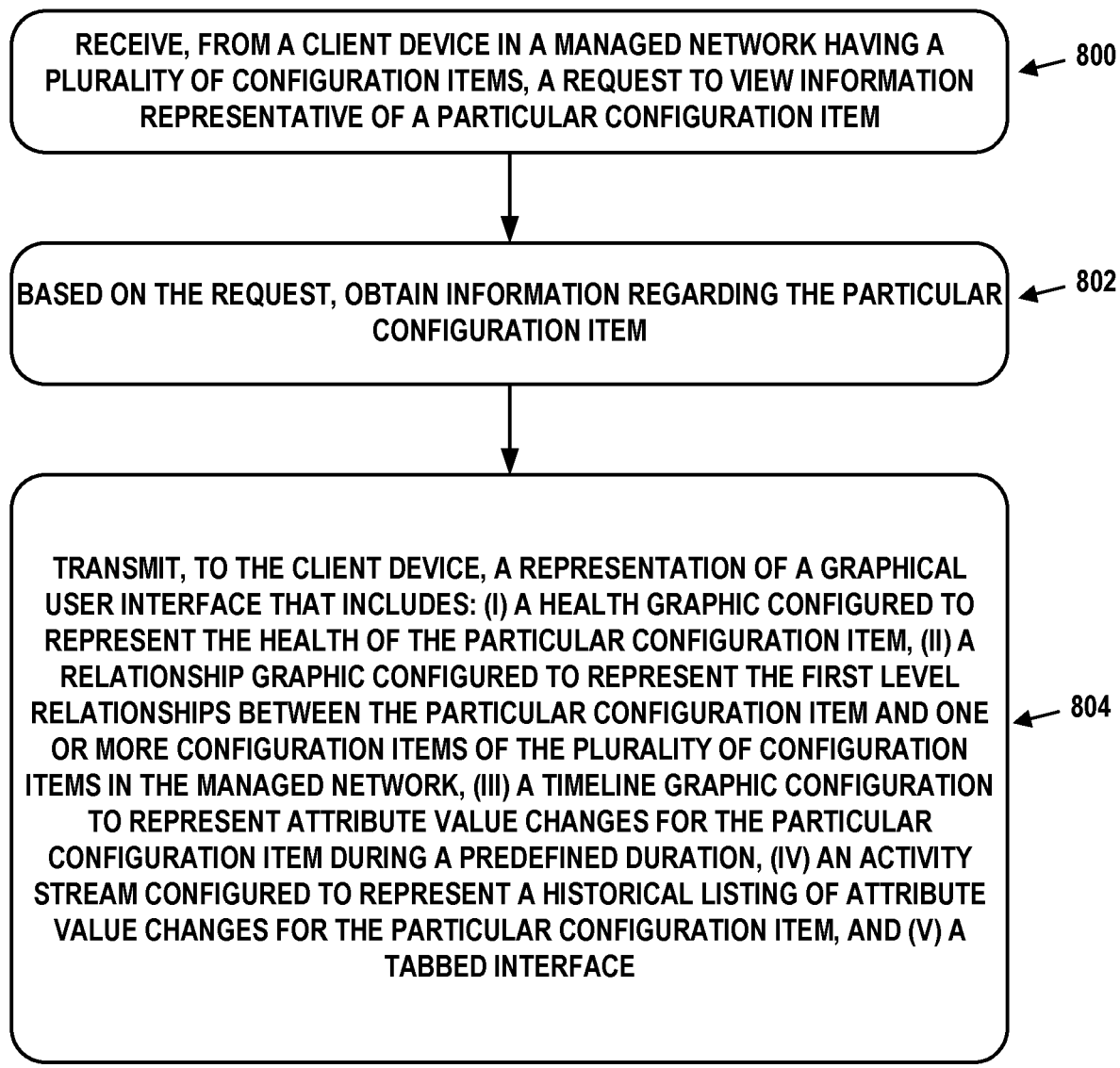
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 involves receiving, from a client device in a managed network having a plurality of configuration items, a request to view information representative of a particular configuration item. A remote network management platform may manage the managed network using one or more server devices. The one or more server devices may be configured to obtain information regarding the plurality of configuration items by way of a proxy server application disposed within the managed network.

Block 802 involves obtaining information regarding the particular configuration item based on the request.

Block 804 involves transmitting, to the client device, a representation of a graphical user interface that includes: (i) a health graphic configured to represent health of the particular configuration item, (ii) a relationship graphic configured to represent first level relationships between the particular configuration item and one or more configuration items of the plurality of configuration items in the managed network, (iii) a timeline graphic configured to represent attribute value changes for the particular configuration item during a predefined duration, (iv) an activity stream configured to represent a historical listing of attribute value changes for the particular configuration item, and (v) a tabbed interface. The tabbed interface may facilitate navigation between attributes corresponding to the particular configuration item and attributes corresponding to one or more other configuration items of the plurality of configuration items in the managed network.

In some embodiments, the representation of the graphical user interface may further include a header that indicates a title, a status, an owner, a last updated indication, and a discovery source corresponding to the particular configuration item. The header may indicate other information in other examples.

In some embodiments, the health graphic may include a chart component configured to represent a number of stale relationships relative to a total number of relationships for the particular configuration item. For instance, a stale relationship may indicate that at least one configuration item in a relationship between two configuration items is offline or undiscoverable. The total number of relationships for the particular configuration item may represent a total number of direct connections between the particular configuration item and additional configuration items.

Some embodiments may involve receiving, from the client device, a selection of a display more option corresponding to the chart component. As such, based on receiving the selection of the display more option, the embodiments may involve causing the chart component to represent a number of incomplete attributes relative to a total number of attributes for the particular configuration item. For instance, an incomplete attribute may be a required attribute (or attribute value) that is not yet filled out for the particular configuration item and the total number of attributes for the particular configuration item may indicate a quantity of attribute values identified for the particular configuration item. The incomplete attributes may indicate that one or more attribute values are currently unavailable for viewing for the particular configuration item.

Some embodiments may further involve receiving, from the client device, a second selection of the display more option corresponding to the chart component. Based on receiving the second selection of the display more option, the embodiments may involve causing the chart component to represent a number of non-compliant relationships relative to the total number of relationships for the particular configuration item. A non-compliant relationship may indicate a relationship that fails to satisfy predefined rules, and the total number of relationships for the particular configuration item may represent a total number of direct connections between the particular configuration item and other configuration items. In some examples, other analytics may be shown by one or more chart components. The analytics may be modified and additional analytics could be added.

Some embodiments may involve receiving, from the client device, a selection of a view map option corresponding to the relationship graphic. Based on receiving the selection, the embodiments may involve causing a map of the first level relationships between the particular configuration item and the one or more configuration items of the plurality of configuration items in the managed network to appear in a pop up window.

Some embodiments may involve the timeline graphic including a plurality of indicators positioned on a timeline to indicate timing for represented attribute value changes, incidents, change requests, and alerts for the particular configuration item during the predefined duration using one or more indicators. In some instances, the plurality of indicators may include a first type of indicator and a second type of indicator. For instance, The first type of indicator may represent a single attribute change for the particular configuration item and the second type of indicator may represent multiple attribute changes corresponding for the particular configuration item. The indicators could include other types of indicators.

Some embodiments may further involve receiving, from the client device, a second request to view information representative of a second configuration item and obtaining information regarding the second configuration item based on the second request. The embodiments may further involve causing the representation of the graphical user interface to display a second representation using the tabbed interface that includes: (i) a second health graphic configured to represent health of the second configuration item, (ii) a second relationship graphic configured to represent first level relationships between the second configuration item and one or more configuration items of the plurality of configuration items in the managed network, (iii) a second timeline graphic configured to represent attribute value changes as well as incident, change requests, and alerts for the second configuration item during a predefined duration, and (iv) a second activity stream configured to represent a historical listing of attribute value changes for the second configuration item. The tabbed interface may enable switching between the representation and the second representation.

Some embodiments may involve receiving, from the client device, a selection of a tab corresponding to the particular configuration item. Based on receiving the selection of the tab corresponding to the particular configuration item, the embodiments may involve causing the representation of the graphical user interface to display the information regarding the particular configuration item.

Some embodiments may involve using an article of manufacture. The article of manufacture may include a non-transitory computer-readable medium, having stored thereon program instructions that, upon execution by a computing system, cause the computing system to perform operations. The operations may include receiving, from a client device in a managed network having a plurality of configuration items, a request to view information representative of a particular configuration item. A remote network management platform may manage the managed network using one or more server devices, and the one or more server devices may be configured to obtain information regarding the plurality of configuration items by way of a proxy server application disposed within the managed network. The operations may further include obtaining information regarding the particular configuration item based on the request, and transmitting, to the client device, a representation of a graphical user interface. The graphical user interface may include: (i) a health graphic configured to represent health of the particular configuration item, (ii) a relationship graphic configured to represent first level relationships between the particular configuration item and one or more configuration items of the plurality of configuration items in the managed network, (iii) a timeline graphic configured to represent attribute value changes for the particular configuration item during a predefined duration, (iv) an activity stream configured to represent a historical listing of attribute value changes for the particular configuration item, and (v) a tabbed interface. The tabbed interface may facilitate navigation between attributes corresponding to the particular configuration item and attributes corresponding to one or more other configuration items of the plurality of configuration items in the managed network.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
one or more hardware processors; and
a non-transitory memory storing instructions that, when executed by the one or more hardware processors, cause the one or more hardware processors to perform actions comprising:
obtaining information regarding a configuration item of a managed network; and
generating a representation of a graphical user interface (GUI) comprising:
a health graphic representing a health of the configuration item, wherein the health graphic comprises a graphical chart component indicating a number of incomplete attributes for the configuration item relative to a total number of attributes for the configuration item; and
a timeline graphic representing attribute value changes for the configuration item during a period of time.

2. The system of claim 1, wherein the graphical chart component comprises a circular graph, a bar graph, or a percentage indication, or any combination thereof.

3. The system of claim 1, wherein the actions comprise:
receiving a user selection of the period of time; and
generating the timeline graphic to represent the attribute value changes over the period of time in response to receiving the user selection.

4. The system of claim 3, wherein the timeline graphic comprises a plurality of selectable periods of time, and wherein the actions comprise receiving the user selection of the period of time from among the plurality of selectable periods of time.

5. The system of claim 1, wherein the actions comprise selecting the period of time based on a timing of the attribute value changes.

6. The system of claim 1, wherein the timeline graphic comprises an indicator for each attribute value change, and wherein the actions comprise:
receiving an input indicative of a selection of a particular indicator; and
in response to receiving the input, generating an additional representation of the GUI indicating additional information about a particular attribute value change represented by the particular indicator.

7. A system, comprising:
one or more hardware processors; and
a non-transitory memory storing instructions that, when executed by the one or more hardware processors, cause the one or more hardware processors to perform actions comprising:
obtaining information regarding a configuration item of a managed network; and
generating a representation of a graphical user interface (GUI) comprising:
a health graphic representing a health of the configuration item, wherein the health graphic comprises one or more selectable options enabling a user to switch between:
a first view of the health graphic including a graphical chart component indicating a number of incomplete attributes for the configuration item; and a second view of the health graphic indicating a number of stale relationships between the configuration item and one or more other configuration items; and a timeline graphic representing attribute value changes for the configuration item during a period of time.

8. The system of claim 7, wherein the actions comprise:
receiving an input indicative of a request to view the first view of the health graphic or the second view of the health graphic; and
generating an additional representation of the GUI comprising the first view of the health graphic or the second view of the health graphic.

9. A method, comprising:
obtaining information regarding a configuration item of a managed network; and
generating a representation of a graphical user interface (GUI) comprising a health graphic representing a health of the configuration item, wherein the health graphic indicates a first amount of incomplete attributes for the configuration item, a second amount of stale relationships between the configuration item and one or more other configuration items, or a third amount of non-compliant relationships between the configuration item and the one or more other configuration items, or any combination thereof.

10. The method of claim 9, wherein the health graphic includes a color representing the first amount, the second amount, or the third amount, or the combination thereof, and wherein the method comprises:

determining that the first amount, the second amount, or the third amount, or the combination thereof, exceeds a predefined threshold; and
adjusting the color in response to determining that the first amount, the second amount, or the third amount, or the combination thereof, exceeds the predefined threshold.

11. The method of claim 9, wherein the health graphic comprises a graphical chart component indicating the first amount of incomplete attributes for the configuration item relative to a total number of attributes for the configuration item, and wherein the graphical chart component comprises a circular graph, a bar graph, or a percentage indication, or any combination thereof.

12. The method of claim 9, wherein the health graphic comprises one or more selectable options enabling a user to switch between:
a first view of the health graphic including a graphical chart component indicating the first amount of incomplete attributes for the configuration item; and
a second view of the health graphic indicating the second amount of stale relationships between the configuration item and the one or more other configuration items.

13. The method of claim 12, comprising:
receiving an input indicative of a request to view the first view of the health graphic or the second view of the health graphic; and
generating an additional representation of the GUI comprising the first view of the health graphic or the second view of the health graphic.

* * * * *